(12) United States Patent
Oniwa et al.

(10) Patent No.: US 7,938,026 B2
(45) Date of Patent: May 10, 2011

(54) MAGNETOSTRICTIVE TORQUE SENSOR AND ELECTRIC STEERING SYSTEM

(75) Inventors: Yoshihiro Oniwa, Utsunomiya (JP);
Takashi Miyoshi, Shioya-gun (JP);
Koichi Fujita, Utsunomiya (JP);
Atsuhiko Yoneda, Utsunomiya (JP);
Yasuo Shimizu, Shimotsuke (JP)

(73) Assignee: Honda Motor Co., Ltd., Tokyo (JP)

( * ) Notice: Subject to any disclaimer, the term of this patent is extended or adjusted under 35 U.S.C. 154(b) by 218 days.

(21) Appl. No.: 12/324,024

(22) Filed: Nov. 26, 2008

(65) Prior Publication Data

US 2009/0314573 A1 Dec. 24, 2009

(30) Foreign Application Priority Data

Nov. 29, 2007 (JP) ................. 2007-308817

(51) Int. Cl.
*G01L 3/02* (2006.01)
(52) U.S. Cl. ................................. 73/862.333
(58) Field of Classification Search ......... 73/862.331–862.336
See application file for complete search history.

(56) References Cited

U.S. PATENT DOCUMENTS

| | | | |
|---|---|---|---|
| 4,697,459 A | 10/1987 | Nonomura et al. | |
| 6,553,847 B2 * | 4/2003 | Garshelis | 73/862.336 |
| 7,131,339 B2 * | 11/2006 | Kwun et al. | 73/862.331 |
| 7,295,001 B2 * | 11/2007 | Kim et al. | 324/209 |
| 7,661,324 B2 * | 2/2010 | Harata et al. | 73/862.333 |
| 7,752,921 B2 * | 7/2010 | Yoneda et al. | 73/862.333 |
| 2002/0078765 A1 * | 6/2002 | Shinoura | 73/862.333 |
| 2005/0204831 A1 * | 9/2005 | Mori et al. | 73/862.331 |
| 2007/0240523 A1 | 10/2007 | Yoneda et al. | |

FOREIGN PATENT DOCUMENTS

| | | |
|---|---|---|
| EP | 0 480 912 A2 | 4/1992 |
| JP | 02 163625 A | 6/1990 |
| JP | 10-213497 A | 8/1998 |
| JP | 11-101699 A | 4/1999 |
| JP | 11-132878 A | 5/1999 |
| JP | 2000-009557 A | 1/2000 |
| JP | 2003-194642 A | 7/2003 |
| JP | 2005-534913 A | 11/2005 |
| JP | 2005-331453 A | 12/2005 |
| JP | 2006-064445 A | 3/2006 |
| JP | 2006-064446 A | 3/2006 |

* cited by examiner

*Primary Examiner* — Max Noori
(74) *Attorney, Agent, or Firm* — Arent Fox LLP

(57) ABSTRACT

A magnetostrictive torque sensor comprising: a magnetostrictive film provided on a ferromagnetic shaft; a bias magnetization device which applies a bias magnetic field to the shaft to magnetize the shaft; and a detection device which detects a change in magnetism of the magnetostrictive film, wherein: a torque acting on the shaft calculated based on the detection results of the detection device; and the bias magnetization device applies a bias magnetic field to the shaft at a predetermined timing.

6 Claims, 4 Drawing Sheets

MAGNETOSTRICTIVE TORQUE SENSOR AND ELECTRIC STEERING SYSTEM

BACKGROUND OF THE INVENTION

Priority is claimed on Japanese Patent Application No. 2007-308817, filed on Nov. 29, 2007, the contents of which are incorporated herein by reference.

FIELD OF THE INVENTION

The present invention relates to a magnetostrictive torque sensor that detects torque based on a change in magnetic properties caused by magnetostriction, and an electric steering system in which it is provided.

DESCRIPTION OF THE RELATED ART

Heretofore, a magnetostrictive torque sensor is known in which magnetostrictive films having magnetic anisotropy are provided on a rotation shaft, and changes in the magnetic permeability of the magnetostrictive films in response to the torque input to the rotation shaft are detected using a detecting coil (for example, refer to Japanese Unexamined Patent Application, First Publication No. 2006-64445).

For this type of magnetostrictive torque sensor, for example, there is one as shown in FIG. 6. The magnetostrictive torque sensor 130 shown in FIG. 6, detects torque acting on the rotation shaft 105 of a steering system of an automobile or the like, and has two magnetostrictive films 131 and 132 that are magnetically anisotropic and have different directions of easy magnetization provided on the surface of the rotation shaft 105. Detecting coils 133 and 134 are provided at locations facing the magnetostrictive films 131 and 132, respectively, at predetermined spacing therefrom. The changes in the inductances of the detecting coils 133 and 134 are output from signal conversion sections 138 and 139, respectively, as voltage signals VT1 and VT2 which are at opposite phases to each other, and a voltage signal in which the voltage signals VT1 and VT2 are differentially amplified, is output from a differential amplification section 140 as a torque detection signal VT3.

Incidentally, in the above-described magnetostrictive torque sensor, the voltage signals VT1 and VT2 which are detection signals, change due to the influence of magnetic fields external to the shaft. As a result there is a possibility that the torque detection signal VT3 changes. Therefore, in recent years, a magnetostrictive torque sensor has been proposed in which the external magnetic toughness is improved by supplying an excitation current into the detecting coil to magnetize the rotation shaft.

FIG. 7 shows an example of a structure for improving the external magnetic toughness of a magnetostrictive torque sensor. Since the detecting coil 133 and the detecting coil 134 are similar circuits but connected in parallel, those parallel parts are shown schematically as one circuit structure in FIG. 7.

The circuit structure shown in FIG. 7 is provided with; an alternating current circuit 111 which supplies alternating current for torque detection to the aforementioned detecting coils 133 and 134 via a capacitor C, a direct current circuit 112 which is connected in parallel with the alternating current circuit 111 and supplies direct current for shaft magnetization, and a current limiting resistor 113 which is disposed between the detecting coils 133 and 134 and an earth E. The construction is such that currents are supplied to the detecting coils 133 and 134 at the same time by the alternating current circuit 111 and the direct current circuit 112, and the voltage signal between the detecting coils 133 and 134 and the current limiting resistor 113 is input to signal conversion sections 138 and 139.

However, in the magnetostrictive torque sensor shown in FIG. 7, the construction is such that a comparatively large current is supplied continuously to the detecting coils in order to magnetize the shaft. Therefore current consumption increases.

Moreover there is concern about the influence on torque detection and fault detection of the magnetostrictive torque sensor due to the current supplied by the direct current circuit.

Therefore, the present invention provides a magnetostrictive torque sensor and an electric steering system that can reduce the current consumption while improving the reliability.

SUMMARY OF THE INVENTION

In order to solve the above-described problems, the present invention adopts the following measures.

That is, a magnetostrictive torque sensor according to the present invention is provided with: a magnetostrictive film provided on a ferromagnetic shaft; a bias magnetization device which applies a bias magnetic field to the shaft to magnetize the shaft; and a detection device which detects a change in magnetism of the magnetostrictive film, wherein: a torque acting on the shaft calculated based on the detection results of the detection device; and the bias magnetization device applies a bias magnetic field to the shaft at a predetermined timing.

According to the present invention, by applying a bias magnetic field to the shaft at a predetermined timing by the bias magnetization device to give bias magnetization, then even after the application of the bias magnetic field is stopped, there is residual magnetization in the ferromagnetic shaft, so that it can act as bias magnetization. Therefore, while improving the external magnetic toughness, it is possible to reduce the current consumption by supplying current temporarily, compared to the conventional case where current is supplied continuously. Furthermore, at the same time, for example the influence on the torque detection and fault detection is also reduced, so that there is an effect in that the reliability can be improved.

Since the heat generation of the circuit can be suppressed by reducing the current consumption, it is possible to use components whose heat resistance is comparatively low. As a result, a reduction in the component cost can be achieved.

In may be arranged such that the bias magnetization device applies the bias magnetic field to the shaft at the time of start up.

In this case, in addition to the above-described effect, by generating a bias magnetic field when starting to operate the magnetostrictive torque sensor, it is possible to suppress the influence on the torque detection by the bias magnetic field. Therefore there is an effect in that the reliability of the torque detection can be improved while improving the external magnetic field toughness.

It may be arranged such that the bias magnetization device applies the bias magnetic field to the shaft when torque does not act on the shaft.

It may be arranged such that there is further provided a failure detection device which detects a failure of the magnetostrictive torque sensor based on the detection results of the detection device, and the detection device does not detect the change in magnetism of the magnetostrictive film and the failure detection device does not detect the failure of the magnetostrictive torque sensor when the bias magnetization device applies the bias magnetic field to the shaft.

In this case, in addition to the above-described effects, since no bias magnetic field is generated while failure detection is being performed by the failure detection device, it is possible to prevent the bias magnetic field from having an influence on failure detection. As a result, there is an effect in that the reliability of failure detection by the failure detection device can be improved while improving the external magnetic field toughness.

An electric steering system is provided with a magnetostrictive torque sensor according to the present invention detects steering torque, wherein the magnetostrictive torque sensor detects steering torque, and drives a motor in accordance with the detected steering torque to steer a vehicle.

In this case, in addition to the above-described effects, it is possible to reduce the current consumption while improving the external magnetic field toughness of the magnetostrictive torque sensor for detecting the steering torque of the electric steering system. Therefore there is an effect in that it can contribute to a reduction in current consumption and an improvement in the reliability of the electric steering system.

It may be arranged such that the bias magnetization device applies the bias magnetic field to the shaft during no steering operation.

DETAILED DESCRIPTION OF THE INVENTION

Next is a description of a first embodiment of a magnetostrictive torque sensor and a vehicle electric power steering system in which it is provided, according to the present invention, with reference to the drawings.

Figure 1:
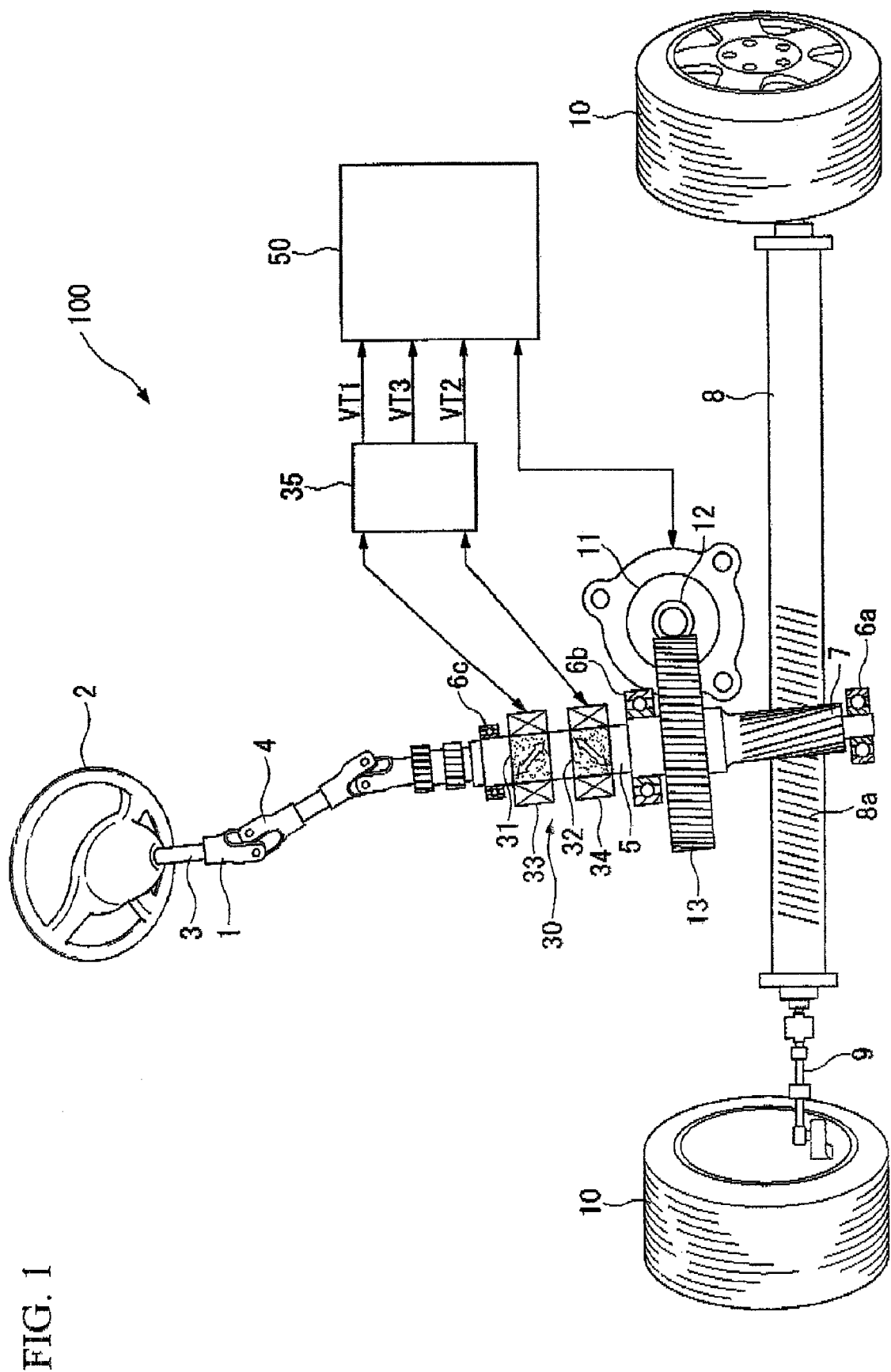
FIG. 1 is a schematic structural diagram of a vehicle electric power steering system provided with a magnetostrictive torque sensor according to an embodiment of the present invention.

As shown in FIG. 1, a vehicle electric power steering system (electric steering system) 100 is provided with a steering shaft 1 connected to a steering wheel (steering device) 2. The steering shaft 1 is constructed with a main steering shaft 3 integrally coupled with the steering wheel 2, and a pinion shaft 5 which is provided with a pinion 7 as part of a rack and pinion mechanism, connected via a universal joint 4. The pinion shaft 5 is formed for example from iron, which is a ferromagnetic material.

The lower, middle, and upper parts of the pinion shaft 5 are supported by bearings 6a, 6b and 6c, and the pinion 7 is provided on the bottom end of the pinion shaft 5. The pinion 7 is engaged with a gear rack 8a of a rack shaft 8 that can be reciprocated in the vehicle widthwise direction, and left and right front wheels 10 serving as steering wheels are joined to the opposite ends of the rack shaft 8 via tie rods 9. Using this construction, normal rack and pinion style turning operation is possible when turning the steering wheel 2, so that it is possible to change the direction of the vehicle by steering the front wheels 10. Here, the rack shaft 8, the rack 8a, and the tie rod 9 constitute the steering mechanism.

The electric power steering system 100 has an electric motor 11 which supplies an auxiliary steering force for reducing the steering effort on the steering wheel 2. A worm gear 12 provided on the output shaft of the electric motor 11 is engaged with a worm wheel gear 13 provided underneath the bearing 6b on the middle part of the pinion shaft 5. A magnetostrictive torque sensor 30 is located between the bearing 6b on the middle part and the bearing 6c on the upper part of the pinion shaft 5, and detects torque based on the change in the magnetic properties caused by magnetostriction.

Figure 2:
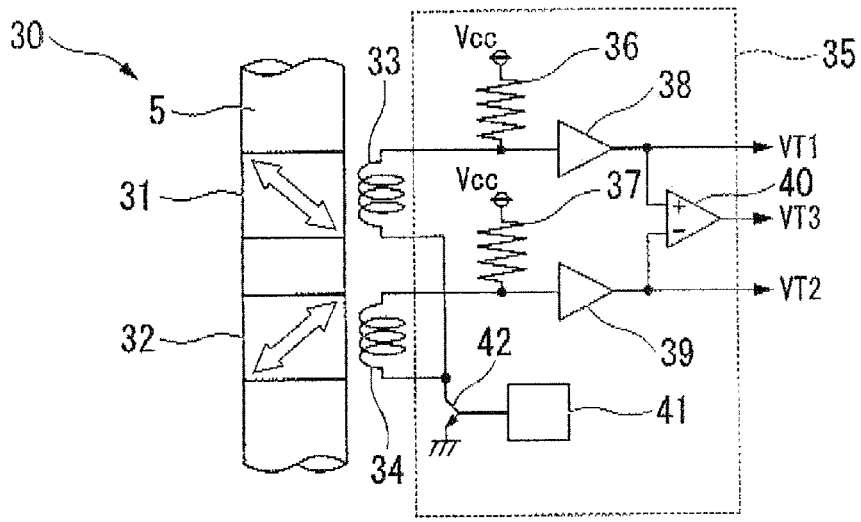
FIG. 2 is a schematic structural diagram of the magnetostrictive torque sensor according to the embodiment of the present invention.

As shown in FIG. 2, the magnetostrictive torque sensor 30 has a first magnetostrictive film 31 and a second magnetostrictive film 32 which are provided in a ring shape around a full circle of the outer peripheral surface of the pinion shaft 5 in the circumference direction. The first magnetostrictive film 31 and the second magnetostrictive film 32 are located in parallel along the axial direction of the pinion shaft 5. The first magnetostrictive film 31 and the second magnetostrictive film 32 are metal films made from a material that exhibits a great change in magnetic permeability with respect to deformation, and are made for example from a Ni—Fe system alloy film, formed using plating or the like around the periphery of the pinion shaft 5.

The first magnetostrictive film 31 is magnetically anisotropic, and its direction of easy magnetization (direction shown by the arrow in FIG. 2) is set in a direction inclined at approximately 45 degrees with respect to the axis of the pinion shaft 5. The second magnetostrictive film 32 is also magnetically anisotropic, similarly to the first magnetostrictive film 31, and its direction of easy magnetization (shown by the arrow in FIG. 2) is set in a direction at 90 degrees with respect to the direction of easy magnetization of the first magnetostrictive film 31.

When compressive forces and tensile forces act on the first magnetostrictive film 31 and the second magnetostrictive film 32 along each of the directions of easy magnetization, their magnetic permeabilities increase and decrease greatly according to the compressive force and the tensile force. When torque with a clockwise or counterclockwise rotation acts on the pinion shaft 5, a compressive force acts on either one of the first magnetostrictive film 31 and the second magnetostrictive film 32 along its direction of easy magnetization, and a tensile force acts on the other one of the first magnetostrictive film 31 and the second magnetostrictive film 32 along its direction of easy magnetization. As a result, the magnetic permeability of one of the first magnetostrictive film 31 and the second magnetostrictive film 32 increases, and the magnetic permeability of the other one of the first magnetostrictive film 31 and the second magnetostrictive film 32 decreases.

A first detecting coil 33 is arranged facing the first magnetostrictive film 31 at a predetermined spacing, and similarly, a second detecting coil 34 is arranged facing the second magnetostrictive film 32 at a predetermined spacing.

The first and second detecting coils 33 and 34 detect the changes in the magnetic permeabilities of the first magnetostrictive film 31 and the second magnetostrictive film 32.

When the magnetic permeability of the first magnetostrictive film 31 changes, the inductance of the first detecting coil 33 increases or decreases, and when the magnetic permeability of the second magnetostrictive film 32 changes, the inductance of the second detecting coil 34 increases or decreases.

The first detecting coil 33 and the second detecting coil 34 are both connected to a detection circuit 35. The detection circuit 35 is supplied with power from an on-board battery (not shown in the figure). The detection circuit 35 is provided with conversion circuits 38 and 39 which convert the inductance of the first detecting coil 33 and the second detecting coil 34 to voltage signals VT1 and VT2 which are in mutually opposite phases with respect to the input torque. The converted voltage signals VT1 and VT2 are output to an electronic controller 50 respectively. Here, the voltage (for example, 5V) on the positive side of the power supply is the upper limit, and the voltage (for example, 0V, which is the earth electric potential) on the negative side of the power supply is the lower limit.

The detection circuit 35 has a differential amplification circuit 40 that differentially amplifies the voltage signals VT1 and VT2, and a torque detection signal VT3 which is a differentially amplified signal output from the differential amplification circuit 40, is output to the electronic controller 50 (refer to FIG. 1). Similarly to the voltage signals VT1 and VT2, the torque detection signal VT3 becomes a voltage signal that changes within the supply voltage of the differential amplification circuit 40.

In the detection circuit 35, power supplies (shown by Vcc in the figure) for supplying excitation current to the first detecting coil 33 and the second detecting coil 34 are connected between the first detecting coil 33 and the conversion circuit 38, and the second detecting coil 34 and the conversion circuit 39, via limit resistors 36 and 37, respectively. A switching device 42 such as a bipolar transistor or the like, is provided between the first detecting coil 33 and the second detecting coil 34 and the earth. The switching device 42 is connected to an excitation signal generating section 41, and performs switching operations based on an excitation signal output from the excitation signal generating section 41.

The excitation signal generating section 41 is connected to the electronic controller 50, and is set such that PWM control is performed to magnetize the pinion shaft temporarily (referred to hereunder simply as "shaft magnetization PWM control") when starting the magnetostrictive torque sensor 30 immediately after the ignition of the vehicle is turned ON, which is a predetermined timing. Moreover, the excitation signal generating section 41 is set such that when shaft magnetization PWM control to magnetize the pinion shaft 5 is not being performed, that is during normal operation of the magnetostrictive torque sensor 30, it performs PWM control for detecting the change in the magnetic permeability of the first magnetostrictive film 31 and the second magnetostrictive film 32 (referred to hereunder simply as "torque detection PWM control"). Here, the above-mentioned "temporarily" means that the shaft magnetization PWM control is performed for only a predetermined time set in advance in order to magnetize the pinion shaft 5 sufficiently, and afterwards, the shaft magnetization PWM control is stopped. The predetermined time for performing the shaft magnetization PWM control may be set appropriately according to the magnetic properties of the pinion shaft 5.

Figure 4:
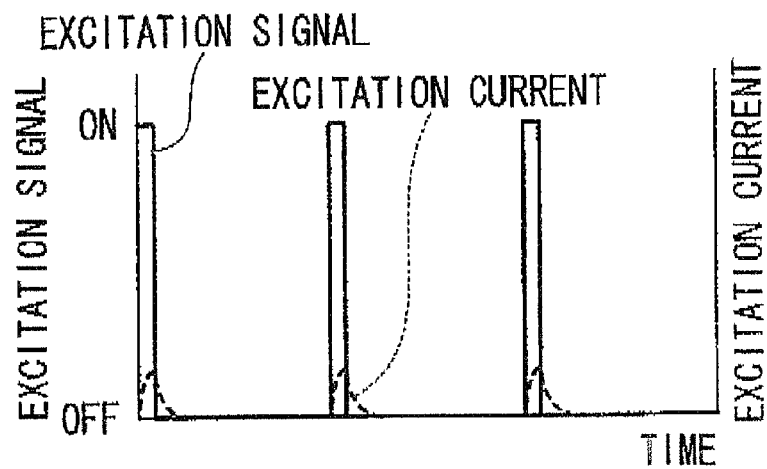
FIG. 4 is a graph showing changes in excitation signal and excitation current during normal operation in the embodiment of the present invention.

FIG. 4 is a graph showing the changes in the excitation signal and the excitation current when performing the torque detection PWM control, with the horizontal axis being time, and the vertical axis being the excitation signal and the excitation current. As is shown in this graph, in the case where torque detection PWM control is performed, the ON time of the switching device 42 is set to be short (for example, approximately 4% duty), and at this time, the excitation current supplied to the first detecting coil 33 and the second detecting coil 34 is a comparatively small excitation current.

Figure 5:
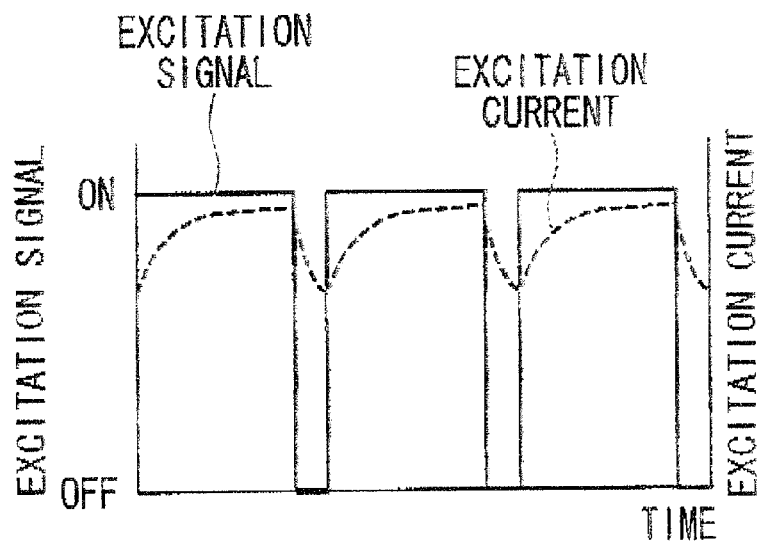
FIG. 5 is a graph showing changes in excitation signal and excitation current during bias excitation in the embodiment of the present invention.
Figure 6:
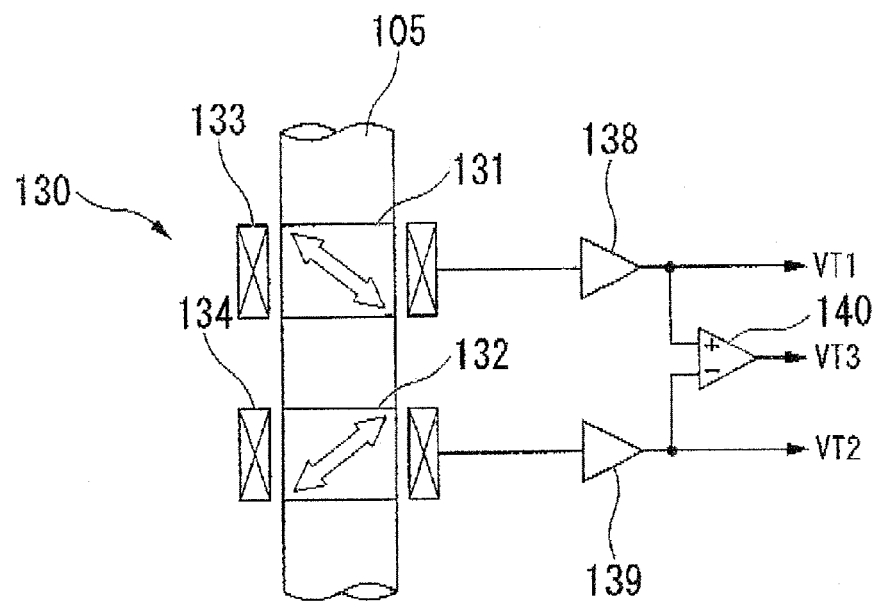
FIG. 6 is a schematic structural diagram of a conventional magnetostrictive torque sensor.
Figure 7:
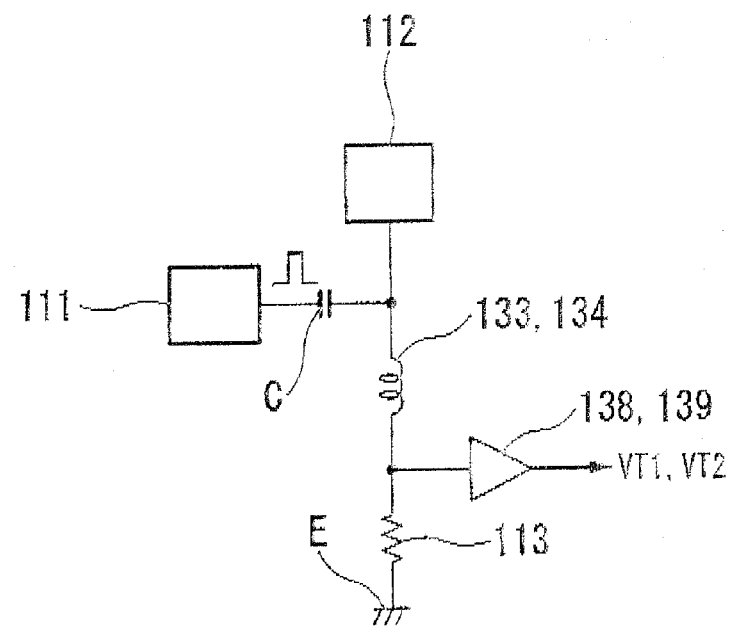
FIG. 7 is a schematic structural diagram showing an example of a circuit that improves the external magnetic toughness in the conventional magnetostrictive torque sensor.

On the other hand, FIG. 5 is a graph showing the changes in the excitation signal and the excitation current in the case where shaft magnetization PWM control is performed and, similarly to FIG. 4, the horizontal axis represents time and the vertical axis represents the excitation signal and the excitation current. As is shown it this graph, the ON time of the switching device 42 is set to be long (for example, approximately 60% duty), and as a result, a comparatively large excitation current, which is sufficient to magnetize the pinion shaft 5, flows through the first detecting coil 33 and the second detecting coil 34. Here as shown in FIG. 4 and FIG. 5, the excitation current supplied through the first detecting coil 33 and the second detecting coil 34 increases gradually when the excitation signal is ON (for example, 5V), and decreases gradually when it is OFF (for example, 0V). A case is described in which the excitation current is controlled using a PWM method. However, the method is not limited to this, provided the amount of current supply can be controlled.

Figure 3:
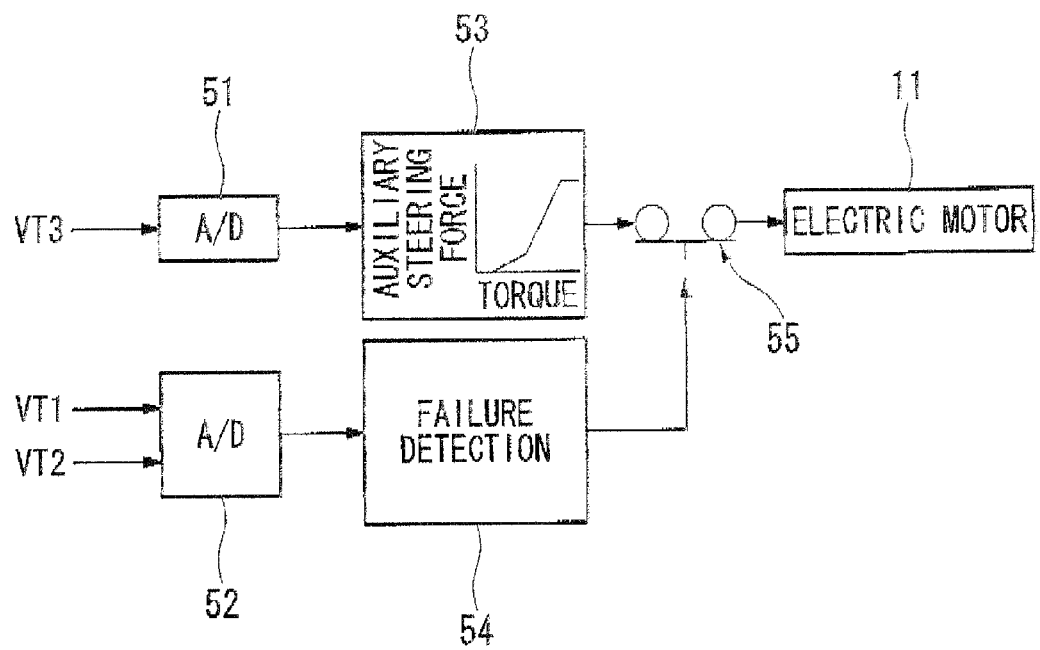
FIG. 3 is a block diagram showing a schematic structure of an electronic controller according to the embodiment of the present invention.

As shown in FIG. 3, the electronic controller 50 is provided with a torque signal reading section 51 which reads the torque detection signal VT3 output from the detection circuit 35, and an auxiliary steering force determining section 53 which determines the auxiliary steering torque based on the torque detection signal read by the torque signal reading section 51. The electronic controller 50 controls the drive of the electric motor 11 based on the auxiliary steering torque determined by the auxiliary steering force determining section 53. The electronic controller 50 is provided with a failure detection signal calculation section 52, which obtains a failure detection signal VTF based on the voltage signals VT1 and VT2 output from the detection circuit 35, and a failure detection section 54 which performs failure detection of the magnetostrictive torque sensor in the case where the failure detection signal VTF is outside of a predetermined range set in advance. Here the failure detection signal VTF can be obtained by equation (1). In equation (1), C is constant.

$$VTF = VT1 + VT2 + C \quad (1)$$

The electronic controller 50 controls such that it operates a cut-off device 55 which disconnects the output from the auxiliary steering force determining section 53 in the case where the failure detection signal VTF is determined to be out of the predetermined range by the failure detection section 54, so as to substantially stop the detection of the torque acting on the pinion shaft 5, and it also advises the fact that failure has been detected via a failure detection display or the like.

The electronic controller 50 disconnects the output from the auxiliary steering force determining section 53 in the case where shaft magnetization PWM control is being performed by the excitation signal generating section 41, and also stops failure detection by the failure detection section 54. That is, the electronic controller 50 substantially prohibits failure detection by the failure detection section 54, and also prohibits torque detection based on the torque detection signal VT3 based on the voltage signals VT1 and VT2, such that control of the electric motor 11 for generating an auxiliary steering force is not performed.

That is, for example when the ignition of the vehicle is turned ON by an occupant, and the magnetostrictive torque sensor 30 is started, the electronic controller 50 performs ON/OFF control of the switching device 42 such that the excitation signal generating section 41 performs shaft magnetization PWM control temporarily, to be specific, only for a predetermined time until the pinion shaft 5 is sufficiently magnetized. Then, equal excitation currents flow into both of the first detecting coil 33 and the second detecting coil 34, generating bias magnetic fields, so that the pinion shaft 5 is magnetized. The electronic controller 50 switches the control of failure detection by the failure detection section 54, and the control of torque detection based on the voltage signal VT3, to an inhibited state when the shaft magnetization PWM control is performed.

After the above predetermined time has elapsed from when the shaft magnetization PWM control was started, the shaft magnetization PWM control is stopped, and then torque detection PWM control is started. At the same time, failure detection by the failure detection section 54, and torque detection based on the voltage signal VT3, which were inhibited by the electronic controller 50, are switched to an allowed state, so the control of failure detection and the control of torque detection are both started.

Therefore, according to the above-described embodiment, shaft magnetization PWM control is performed at a predetermined timing by the excitation signal generating section 41 and the switching device 42, so that bias magnetic fields are generated by the first detecting coil 33 and the second detecting coil 34 temporarily to bias magnetize the pinion shaft 5. As a result, even after bias magnetization is stopped, there is residual magnetization in the ferromagnetic pinion shaft 5, and this can act as bias magnetization. Therefore, while improving the external magnetic toughness, it is possible to reduce the current consumption by supplying current temporarily, compared to the conventional case where current is supplied continuously to the detecting coils. Furthermore, at the same time, for example the influence on torque detection and fault detection is also reduced, so that the reliability can be improved.

Furthermore, heat generation of the circuit can be suppressed by reducing the current consumption. Therefore, it is possible to use components whose heat resistance is comparatively low, and hence a reduction in the component cost can be achieved.

By generating a bias magnetic field temporarily when starting to operate the magnetostrictive torque sensor, it is possible to suppress the influence on the torque detection by the bias magnetic field for magnetizing the pinion shaft 5. Therefore it is possible to further improve the reliability of the torque detection while improving the external magnetic field toughness.

While failure detection is performed by the failure detection device 54, no bias magnetic field for magnetizing the pinion shaft 5 is generated. Therefore, it is possible to prevent the bias magnetic field from having an influence on failure detection. As a result, it is possible to improve the reliability of failure detection by the failure detection section 54 while improving the external magnetic field toughness.

It is possible to reduce the current consumption while improving the external magnetic field toughness of the magnetostrictive torque sensor 30 for detecting the steering torque. Therefore it is possible to contribute to a reduction in current consumption and an improvement in the reliability of the vehicle electric power steering system equipped with the magnetostrictive torque sensor 30.

The present invention is not limited to the above-described embodiment. For example, it can be applied to a magnetostrictive torque sensor that detects torque acting on a ferromagnetic rotation shaft, a shaft, or the like, other than the torque acting on a pinion shaft 5 of an electric power steering system.

In the embodiment, a case is described in which shaft magnetization PWM control is performed temporarily, to be specific, for only a predetermined time until the pinion shaft 5 is sufficiently magnetized, when the ignition is turned ON which is a predetermined timing, and the magnetostrictive torque sensor 30 is started. However, this is not a limitation, and for example, a timing at which there is no concern of an occupant operating the steering operation, such as when the vehicle is stopped, may be used.

The present invention is not limited to the application to an electric power steering system of the above-described embodiment, and it is also possible to apply it to a vehicle steering system of a steer-by-wire system. A steer-by-wire system is a steering system in which a steering device and a turning mechanism are separated mechanically, and a steering motor provided in the turning mechanism is driven to turn the steering wheels of the vehicle according to the steering torque acting on the steering device. It is possible to, use the magnetostrictive torque sensor according to this invention for the detection of steering torque acting on the steering device.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A magnetostrictive torque sensor comprising:
    a magnetostrictive film provided on a ferromagnetic shaft;
    a bias magnetization device which applies a bias magnetic field to the shaft to magnetize the shaft; and
    a detection device which detects a change in magnetism of the magnetostrictive film, wherein:
    a torque acting on the shaft calculated based on the detection results of the detection device; and
    the bias magnetization device applies a bias magnetic field to the shaft at a predetermined timing.

2. The magnetostrictive torque sensor according to claim 1, wherein the bias magnetization device applies the bias magnetic field to the shaft at the time of start up.

3. The magnetostrictive torque sensor according to claim 1, wherein the bias magnetization device applies the bias magnetic field to the shaft when torque does not act on the shaft.

4. The magnetostrictive torque sensor according to claim 1, further comprising a failure detection device which detects a failure of the magnetostrictive torque sensor based on the detection results of the detection device, and
    the detection device does not detect the change in magnetism of the magnetostrictive film and the failure detection device does not detect the failure of the magnetostrictive torque sensor when the bias magnetization device applies the bias magnetic field to the shaft.

5. An electric steering system comprising a magnetostrictive torque sensor according to any one of claims 1 to 4 detects steering torque, wherein
    the magnetostrictive torque sensor detects steering torque, and drives a motor in accordance with the detected steering torque to steer a vehicle.

6. The electric steering system according to claim 5, wherein the bias magnetization device applies the bias magnetic field to the shaft during no steering operation.

* * * * *